HIGH DENSITY DUAL TRACK REDUNDANT RECORDING SYSTEM

Original Filed May 3, 1960 4 Sheets-Sheet 1

*INVENTOR.*
ANDREW GABOR
*BY*
Douglas M. Clarkson
ATTORNEY

HIGH DENSITY DUAL TRACK REDUNDANT RECORDING SYSTEM

Original Filed May 3, 1960 4 Sheets-Sheet 2

INVENTOR.
ANDREW GABOR
BY
Douglas M. Clarkson
ATTORNEY

Aug. 2, 1966 A. GABOR 3,264,623

HIGH DENSITY DUAL TRACK REDUNDANT RECORDING SYSTEM

Original Filed May 3, 1960 4 Sheets-Sheet 3

INVENTOR.
ANDREW GABOR
BY
Douglas M. Clarkson
ATTORNEY

HIGH DENSITY DUAL TRACK REDUNDANT RECORDING SYSTEM

Original Filed May 3, 1960 4 Sheets-Sheet 4

INVENTOR.
ANDREW GABOR
BY
Douglas M. Clarkson
ATTORNEY

United States Patent Office 3,264,623

Patented August 2, 1966

3,264,623
HIGH DENSITY DUAL TRACK REDUNDANT RECORDING SYSTEM

Andrew Gabor, Huntington, N.Y., assignor to Potter Instrument Co. Inc., Plainview, N.Y., a corporation of New York Original application May 3, 1960, Ser. No. 26,538, now Patent No. 3,217,329, dated Nov. 9, 1965. Divided and this application Apr. 29, 1965, Ser. No. 451,915
10 Claims. (Cl. 340—174.1)

This is a division of Serial No. 26,538 filed May 3, 1960 now Patent No. 3,217,329 and entitled "High Density Recording System."

The present invention concerns magnetic recording and, in particular, means for high density recording with self-clocking characteristics.

In digital computer memory systems, as well as in other applications, magnetic recording on plastic base tapes has undergone wide application. In most of these systems and applications it is important to record as much information per unit of length as possible. The recording is in the form of bits of two kinds, commonly designated as "yes" and "no" or "1" and "0". Broadly two types of recording may be utilized; return to zero (RZ) or non-return to zero (NRZ).

In the former, the tape receives signals representing the bits separated by intervals of zero signal which produce spaces of zero magnetic flux between bits. In the latter, there are no zero signal intervals between the bits of information recorded on the tape.

In order to record more information per unit length on a magnetic tape than is possible with a single track, it is common to record a number of parallel tracks on the tape. In order to conserve space, it is also common to provide a single synchronizing track for several parallel record tracks.

Simple non-return to zero recording runs into serious difficulties when the density of recording is increased to a point where the response of the system exhibits non-linear frequency distortion within the operating range. This ultimately places an upper limit on the bit density which may be recorded and recovered. This difficulty may be overcome by a method of high density recording with a contiguous waveform involving at least one flux reversal per bit cell set forth in U.S. Patent No. 2,853,357, page 5.

According to the present invention, a signal is utilized in recording information which is a modification of the signal and method set forth in the above referred to patent. This provides a high density, self-clocking signal. In addition, it has been found that when two tracks are recorded separated by a distance of the order of sixty mils that the optimum condition is provided of minimum drop out due to imperfections of the recording surface and drop out due to time displacement between the tracks.

The playback of this high density, high reliability recording is carried out in accordance with one of four possible methods of combining the readings of the two record tracks to form a redundant result. First, the system may be practiced by using separate record amplifiers, separate playback amplifiers and by combining ("OR" gating) the outputs of the playback amplifiers.

Second, the recording may be done through separate channels and the playback by combining the outputs of two playback heads. Third, recording may be done by feeding into two recording tracks in combination and playing back through separate amplifiers. Fourth, recording may be done by feeding into combined recording tracks and playing back from the combined tracks. In all of the above, reversing the polarity of signal between the two tracks reduces the resultant noise to signal level.

The recording, according to the present invention, consists in a system utilizing a self-clocking, non-return-to-zero signal. Clock pulses marking the bit cell boundaries are fed to the record amplifier continuously regardless of data bit combination. Data pulses consisting of a pulse for a "1" and an absence of pulse for a "0" are delayed so as to be situated at the center of the cell.

After mixing clock and data pulses, a current transition is generated for each pulse by means of a flip-flop or equivalent circuit. The resulting signal is the recording waveform characterized by a current transition at each cell boundary. It has been found that this method of recording signal generation provides a signal which prevents pulse crowding and which is self-clocking. When two such signals are utilized and are recorded at optimum spacing on the recording tape, a system is provided having maximum density per inch capabilities combined with minimum drop-out or loss of information.

Accordingly, one object of the present invention is to provide a method of and means for high reliability, high density digital data recording.

Another object is to provide a high density recording which is self-clocking.

Still another object is to minimize drop-out in a high density data recording system.

A further object is to provide a system with maximum reliability in the signal recovered from the tape recording.

A still further object is to provide a simple and effective method of and means for starting the recording according to the present invention which is not ambiguous.

Another object is to provide redundant recordings at high density and high degree of reliability.

These and other objects of the present invention will be apparent from the detailed description of the invention when taken in connection with the various figures of the drawing.

Figure 1:
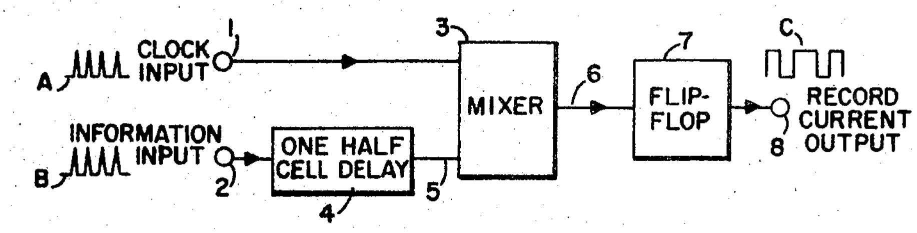
FIG. 1 shows a block diagram of a portion of a recording system in accordance with the present invention.

FIG. 1 shows how clock input signals A are applied to input terminal 1, information input signals B are applied to input terminal 2. The information signals applied at 2 are delayed one-half cell period in delay circuit 4 and are applied over line 5 to mixer 3. Clock signals A applied at 1 are also fed to mixer 3. The mixed clock and delayed information signals are applied to flip-flop 7 over line 6. The flip-flop output appears at 8 for controlling the recorded signal in the form shown at C.

Figure 2:
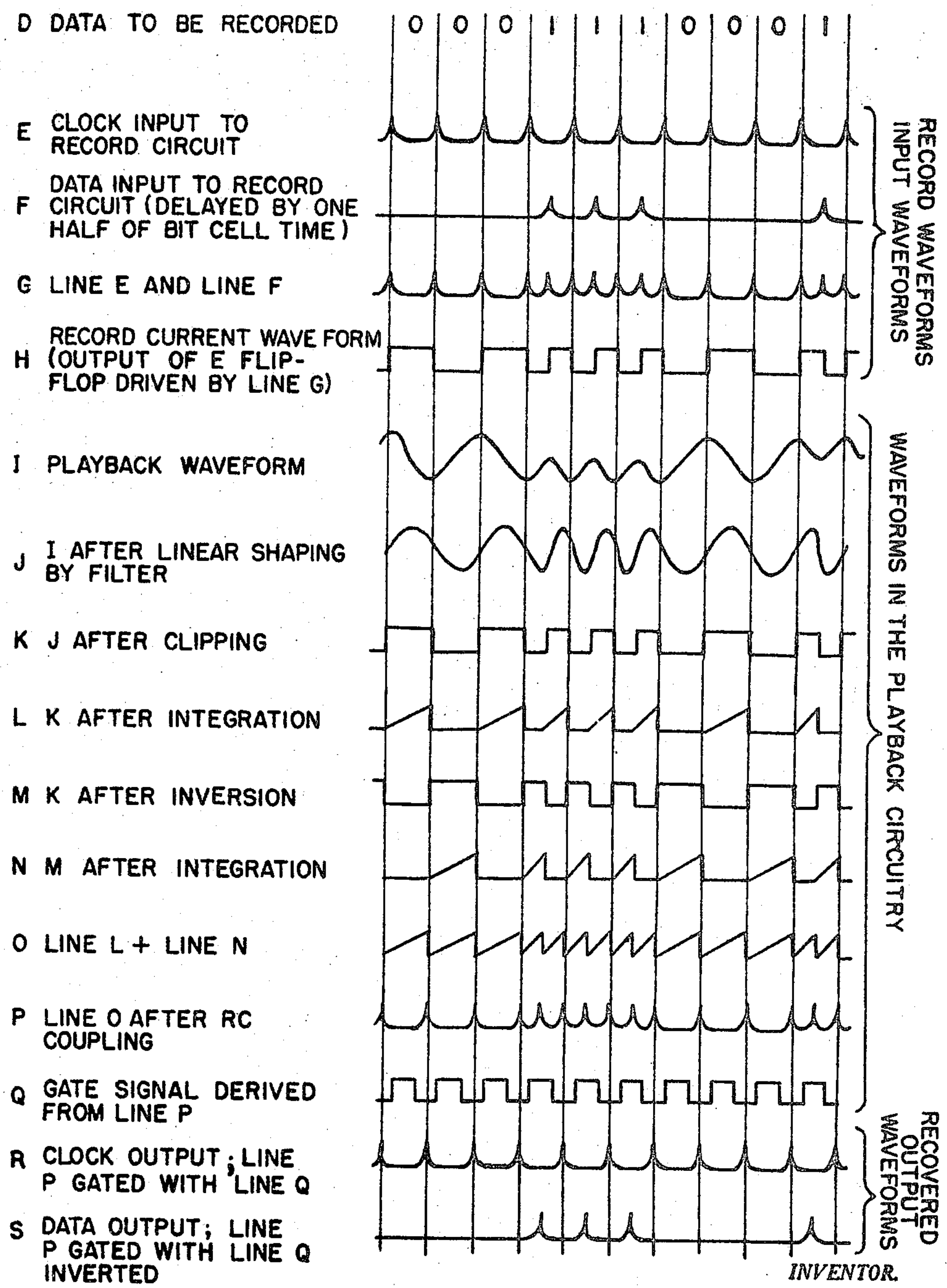
FIG. 2 shows a series of signal waveforms utilized in a system according to the present invention.

FIG. 2 shows a series of waveforms typical of the signals for a recording and playback system according to the present invention. Line D indicates a series of "0's" and "1's" to be recorded. Line E shows the clock input signal to the record circuit. Line F shows the waveform of the signal generated by the data to be recorded delayed by one-half of a bit cell time. Line G shows the sum of signals of lines E and F.

Line H shows the record current waveform which is the output of the flip-flop as shown in FIG. 1. This series of waveforms up to this point are typical of a system according to the present invention up to the generation of recording current. Details of the system prior to parts shown in FIG. 1 have not been given since it is well known in the art how signals are generated up to this point.

The data signals and clock signals at 1 and 2 of FIG. 1 are assumed to have been generated so as to be in time phase. This will be the usual situation where data is released for recording by the clock signals. The delay device 4 for delaying the input information by one-half cell time may be any suitable device capable of providing a predetermined time delay such as a mono-stable multivibrator. A delay line could be used but since fidelity is not important, a less expensive device will be found suitable.

Figure 3:
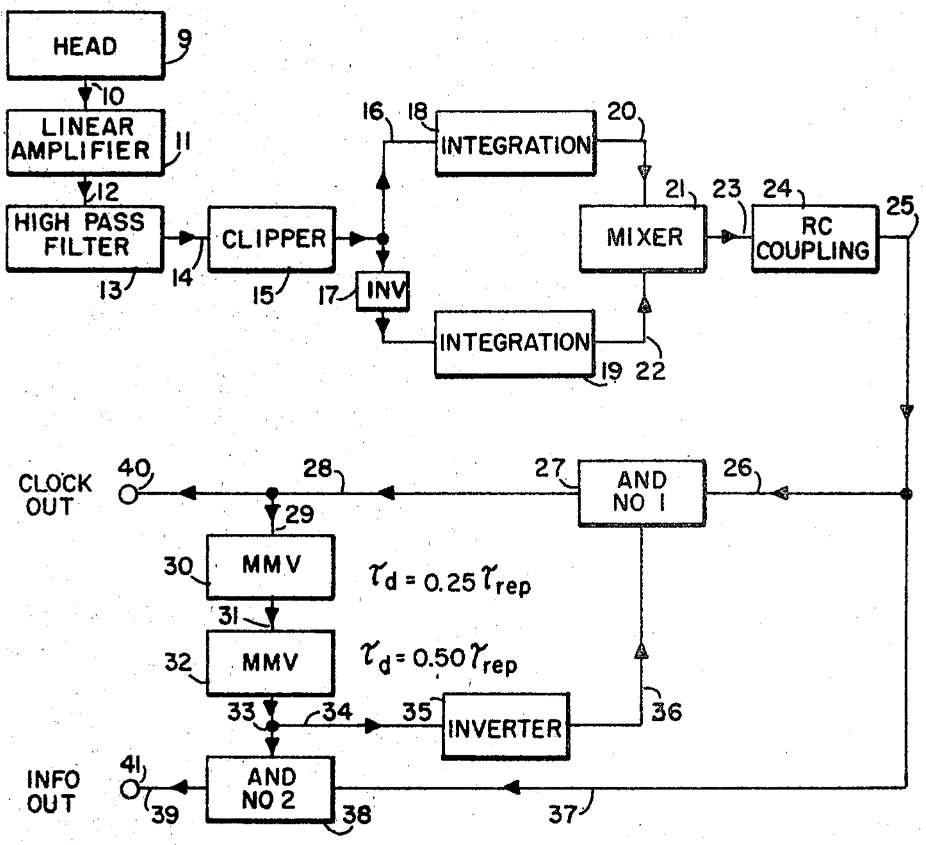
FIG. 3 shows a block diagram of another portion of a recording system in accordance with the present invention.

Continuing with FIG. 2, the waveforms I through Q are the waveforms found in the playback circuitry according to the present invention. The playback waveform shown at line I is amplified in a linear amplifier and passed through a high pass filter to provide the waveform shown at J. This process is illustrated in FIG. 3 where head 9 picks up the playback waveform, passes it to linear amplifier 11 over line 10, which, in turn, passes the amplified signal to high pass filter 13 over line 12.

This high pass filter 13 may be a simple two section RC filter. The amplified signal is passed to a clipper 15 over line 14. The clipper 14 is one which clips the signal both top and bottom close to the base line producing the waveform K of FIG. 2 which will be seen to be a reproduction of the recording current waveform of line H. The next step is to recover the waveform of line G which may be accomplished by means of a simple RC coupling filter and a full wave rectifier but, however, may be accomplished to advantage in a less direct manner.

The square waves K are fed over line 16 to integrator 18 (see FIG. 4) to line 20 and mixer 21. After this integration, the waveform of L in FIG. 2 is provided. Also, in FIG. 1, the waveform K is inverted in inverter 17 and the resulting inverted signals fed to mixer 21 over line 22. The inverted waveform is shown at M and the integrated inverted waveform at N. The two waveforms L and N mixed in mixer 21 appear on line 23 as shown at O.

This waveform in turn is passed through RC coupling 24 appearing on line 25 as shown at O and P, respectively. The waveform P on line 25 is applied to AND gate No. 1 (27) over line 26 and AND gate No. 2 (38). The output of gate 27 over line 28 is applied to a pulse generator monostable multivibrator 30 over line 29 which has a pulse ON period of 0.25 of the repetition period. The output of this pulse generator is applied over line 31 to pulse generator 32 which has a pulse ON period of 0.5 of the repetition rate and is triggered by the trailing edge of the pulse from 30.

Hence, the output of pulse generator monostable multivibrator 32 will be one-half period pulses delayed one quarter period as shown at Q. These pulses applied over line 34 to inverter 35, the output of which is applied over line 36 to AND gate 27, inhibit those portions of the signal of line P which are not clock pulses. Therefore the output over line 28 to point 40 will be made up of clock pulses only. The output of pulse generator 32 over line 33 when applied to AND gate 38 serves to inhibit all clock pulses and pass all signal pulses so that its output over line 39 to point 41 consists in information only as shown at S. At R is shown a representation of the clock pulses provided at point 40.

Figure 4:
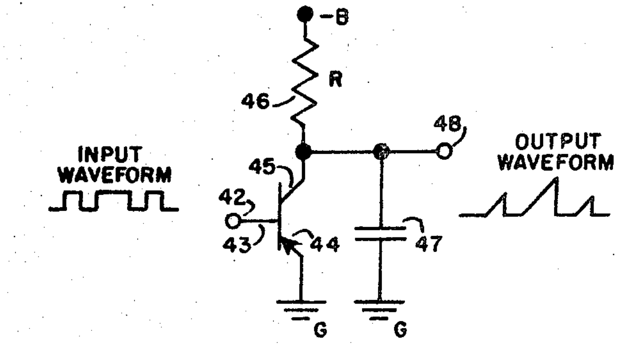
FIG. 4 shows circuit details of an RC integrator suitable for use in systems according to the present invention.

FIG. 4 shows an integrating circuit suitable for use in a system according to the present invention. This integrator includes a transistor having an emitter 44 connected to ground G, a base 43 connected to an input point 42 and a collector 45 connected through a load resistor 46 to a source of bias indicated as —B. When a square wave as illustrated by the "Input Waveform" is applied to input point 42, output current in the transistor collector circuit charges capacitor 47 through resistor 46 producing an integrated output at 48 having the form illustrated by the "Output Waveform."

Figure 5:
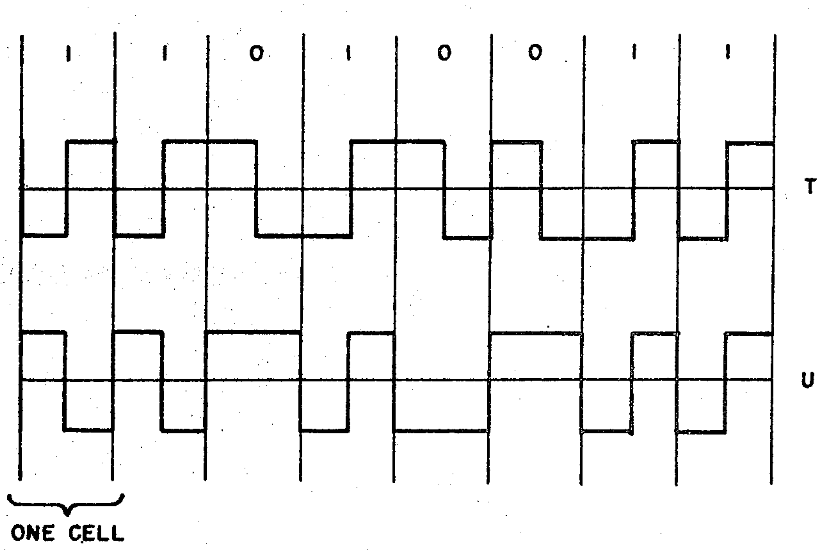
FIG. 5 shows comparison between the recording waveform of the present invention and the waveform of the reference patent.

FIG. 5 shows a comparison between recording current waveforms of recording in accordance with U.S. Patent No. 2,853,357 on line T and the present invention on line U.

Figure 6:
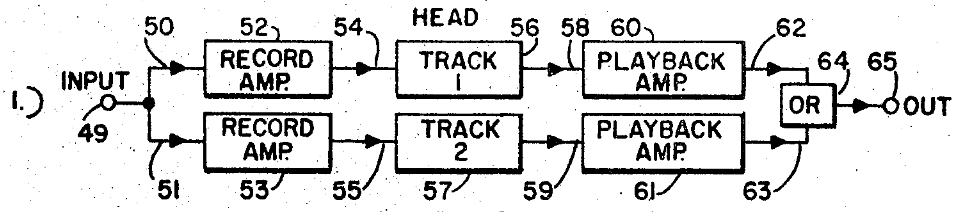
FIG. 6 shows a block diagram of one way in which playback of a redundant recording may be carried out in accordance with the present invention.

FIG. 6 shows a block diagram of a redundant playback of one form in accordance with the present invention. Input signals to be recorded are applied to the common input point 49 and divide over lines 50 and 51 to recording amplifiers 52 and 53, respectively. The outputs of these two recording amplifiers are applied to recording heads 56 and 57 over lines 54 and 55 for recording on two independent tracks on the magnetic tape (not shown). Thus, information is recorded on magnetic tape utilizing two independent recording amplifiers and two independent recording heads.

To play back the information thus recorded the same heads 56 and 57 are utilized to pick up the information from the tape and to feed it over lines 58 and 59 to playback amplifiers 60 and 61. The outputs of amplifiers 62 and 63 are applied to an OR circuit 64 over lines 62 and 63 to produce an output at output point 65. This output will then be the signal from head 56 or 57 so that if a defect in the tape causes any information to be missing from the output of one head, it will be present from the output of the other head and, at the output point, complete data will be presented.

Figure 11:
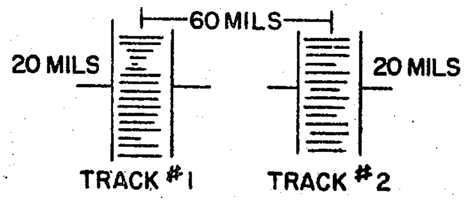
FIG. 11 shows typical track width and spacing in accordance with the present invention.

FIG. 11 shows a typical recording pattern on magnetic tape for providing error free redundant recording and playback. In this case, the recording tracks Track No. 1 and Track No. 2 are each 20 mils wide and separated by 60 mils center to center. This has been found to be a satisfactory pattern for the high density recording according to the present invention.

Figure 10:
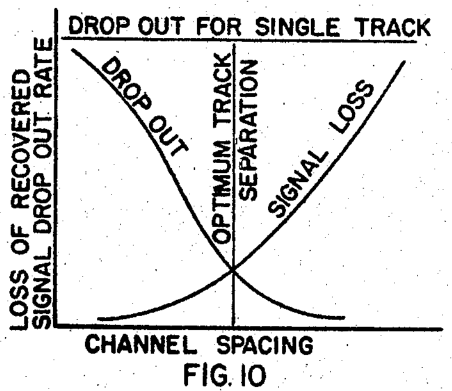
FIG. 10 shows curves of signal loss in magnetic recording useful in explaining the operation of the present invention.

FIG. 10 illustrates the application of the redundant recording in accordance with the present invention to magnetic recording generally. The curve labeled "Drop Out" shows how the loss of recovered signal due to imperfections in the tape decreases as the spacing between the two utilized channels is increased. This shows a large decrease in drop out as the channel spacing is increased up to a point after which the gain in reliability falls off.

Another curve labeled "Signal Loss" represents the way in which the loss in signal increases with channel spacing due to increasing inter-channel time displacement. It will be seen that as the drop out rate due to defects decreases with channel spacing, the signal loss increases. The Optimum Track Separation can be found where the drop out has decreased to a low level and the signal loss has just started to increase rapidly. As was stated above, in one particular case the optimum condition was substantially that in which the channels were 20 mils wide separated by 60 mils center to center.

Figure 7:
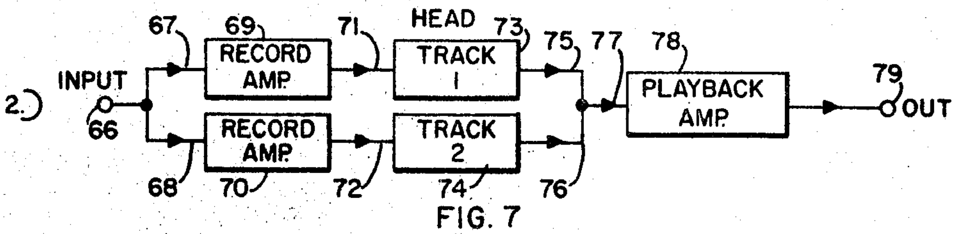
FIGS. 7, 8 and 9 show block diagrams of additional ways in which redundant playback in accordance with the present invention may be carried out.

FIG. 7 shows a block diagram of another way in which redundant recording may be practiced. In this case, input signals applied to point 66 are divided over lines 67 and 68 and applied to recording amplifiers 69 and 70, respectively. The two amplifier outputs are applied to heads 73 and 74 over lines 71 and 72, respectively, providing the dual recording tracks on the magnetic tape (not shown). These same heads 73 and 74 used as pick-up heads for the recorded signals apply the picked up signals to a single playback amplifier 78 over lines 75 and 76 combining in line 77. The combined output then appears at output point 79.

Figure 8:
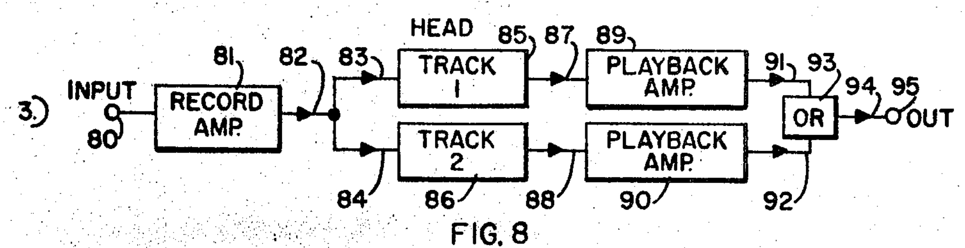

FIG. 8 shows still another combination for providing the redundant recording and playback in which input signals are applied to point 80 and thus to a single recording amplifier 81. The output of the recording amplifier over line 82 is divided over lines 83 and 84 and applied to heads 85 and 86, respectively, providing the two record tracks on the magnetic tape (not shown). Heads 85 and 86 in playing back the redundant signals apply signals to amplifiers 89 and 90 over lines 87 and 88, respectively. The outputs of the two amplifiers over lines 91 and 92 are combined in the OR circuit 93 to provide an error free output over line 94 to output point 95.

Figure 9:
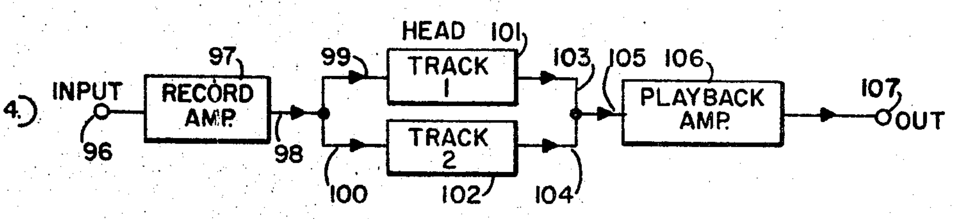

FIG. 9 shows still another form of the redundant recording and playback system in which input signals at point 96 are applied to a single recording amplifier 97. The output of amplifier 97 over line 98 is divided over lines 99 and 100 and applied to heads 101 and 102, respectively, for recording two tracks on the magnetic tape (not shown). In playing back, the two heads 101 and 102 pick up signals from the record tracks and apply them over lines 103 and 104 combining in line 105 to the single playback amplifier 106. The error free output thus produced is applied to output point 107.

What is claimed is:

1. In a digital information recording and recovery system, the combination of, means for deriving self-clocking information signals from a prerecorded dual-track redundant magnetic tape wherein said redundant tracks are spaced by a predetermined amount at which the combined signal loss due to imperfections in the tape and due to inter-channel time displacement is substantially at a minimum, means for deriving from said signals a series of pulses representing composite information and clock signals, and means for separating said composite signals into separate clock and information signals.

2. In a digital information recording and recovery system, the combination of, means for picking up prerecorded signals from two tracks on a magnetic tape wherein said tracks are spaced by a predetermined amount at which the combined signal loss due to imperfections in the tape and due to inter-channel time displacement is substantially at a minimum, means for combining said picked up signals to form a substantially skip-free composite signal, means deriving from said composite signal a series of pulses of combined clock and data signals, and means for separating said combined clock and data signals into data signals and clock signals free from data signals.

3. In a digital information recording and recovery system, the combination of, a source of clock pulses, a source of information pulses synchronized with said clock pulses, means for mixing said clock and information pulses, means for generating recording current in accordance with said mixed pulses, dual-track redundant recording means for recording two tracks on magnetic tape spaced by a predetermined amount at which the combined signal loss due to imperfections in the tape and due to inter-channel time displacement is substantially at a minimum, means for supplying both of said dual-track recording means with said recording current, and means for deriving self-clocking information signals from said two tracks on said magnetic tape.

4. In a digital information recording and recovery system, the combination of, a source of clock pulses, a source of information pulses synchronized with said clock pulses, means for mixing said clock and information pulses, means for generating recording current in accordance with said mixed pulses, dual-track redundant recording means for recording two tracks on magnetic tape spaced by a predetermined amount at which the combined signal loss due to imperfections in the tape and due to inter-channel time displacement is substantially at a minimum, means for supplying both of said dual-track recording means with said recording current, means for deriving self-clocking information signals from said two tracks on said magnetic tape, means for deriving from said signals a series of pulses representing composite information and clock signals, and means for separating said composite signals into separate clock and information signals.

5. In a high density magnetic tape recording and recovery system, the combination of, a source of clock pulses, a source of information pulses, means defining a dual-track information channel wherein said tracks are spaced by a predetermined amount at which the combined signal loss due to imperfections in the tape and due to inter-channel time displacement is substantially at a minimum, means for delaying said information pulses by a period of time substantially equal to one-half the time between adjacent clock pulses, means for mixing the clock pulses and the delayed information pulses, means for generating recording current under control of said mixed pulses including means for recording the mixed pulses in both tracks of said channel, and means for picking up recorded mixed pulses from said dual-track information channel.

6. In a high density magnetic tape recording and recovery system, the combination of, a source of clock pulses, a source of information pulses, means defining a dual-track information channel with the tracks separated by a predetermined amount at which the combined signal loss due to imperfections in the tape and due to inter-channel time displacement is substantially at a minimum, means for delaying said information pulses by a period of time substantially equal to one-half the period of said clock pulses, means for mixing said clock pulses and said delayed pulses to form a composite series of pulses, means for generating recording current under control of said mixed pulses including means for recording the mixed pulses in both tracks of said channel, means for deriving self-clocking information signals from said tracks of said channel, means for deriving from said signals a series of pulses representing composite information and clock signals, and means for separating said composite signals into separate clock and information signals.

7. In a digital information recording and recovery system as set forth in claim 6 wherein said predetermined amount is in the order of sixty mils.

8. In a digital information recording and recovery system, the combination of, a source of clock pulses, a source of information pulses synchronized with said clock pulses and of the type in which a pulse in a cell bit interval of time represents a "1" and an absence of a pulse in a cell bit interval of time represents a "0," means defining a dual-track information channel with tracks separated by a predetermined amount at which the combined signal loss due to imperfections in the tape and due to inter-channel time displacement is substantially at a minimum, means for displacing pulses from one of said pulses with respect to the pulses of the other of said sources by substantially one-half of a cell bit of an interval to place said information pulses substantially mid-way between said clock pulses, means for mixing said displaced information and clock pulses to form a composite series of pulses, means for generating recording current of two values switched from one of said values to the other by each pulse in composite series of pulses including means for recording the mixed pulses in both tracks of said channel, and means for deriving self-clocking information signals from each track of said channel.

9. In a digital information recording and recovery system the combination of means for deriving self-clocking information signals from a prerecorded dual-track redundant magnetic tape wherein the redundant tracks are spaced by an amount at which the signal loss due to imperfections in the tape is approximately equal to the signal loss due to inter-channel time displacement, means for deriving from said signals a series of pulses representing composite information and clock signals, and means for separating said composite signals into separate clock and information signals.

10. In a digital information recording and recovery system the combination of, means for deriving self-clocking information signals from a prerecorded dual-track redundant magnetic tape wherein said redundant tracks are spaced by a predetermined amount on the order of sixty mils, means for deriving from said signals a series of pulses representing composite information and clock pulses, and means for separating said composite signals into separate clock and information signals.

References Cited by the Examiner

UNITED STATES PATENTS 2,813,259 11/1957 Burkhart ---------- 340—174.1

FOREIGN PATENTS 792,294 3/1958 Great Britain.

BERNARD KONICK, *Primary Examiner.*

IRVING SRAGOW, *Examiner.*

A. I. NEUSTADT, *Assistant Examiner.*